(12) United States Patent
Kobayashi et al.

(10) Patent No.: US 8,155,848 B2
(45) Date of Patent: Apr. 10, 2012

(54) VEHICLE CONTROL APPARATUS

(75) Inventors: Yasuhiko Kobayashi, Anjo (JP); Yoshinori Shibayama, Anjo (JP)

(73) Assignee: Aisin AW Co., Ltd., Aichi-Ken (JP)

( * ) Notice: Subject to any disclaimer, the term of this patent is extended or adjusted under 35 U.S.C. 154(b) by 447 days.

(21) Appl. No.: 12/418,026

(22) Filed: Apr. 3, 2009

(65) Prior Publication Data

US 2009/0271079 A1    Oct. 29, 2009

(30) Foreign Application Priority Data

Apr. 28, 2008 (JP) ................... 2008-117398

(51) Int. Cl.
*G06F 17/00* (2006.01)
(52) U.S. Cl. ........................................ 701/66
(58) Field of Classification Search ............... 903/904; 701/22, 51, 66; 477/5
See application file for complete search history.

(56) References Cited

U.S. PATENT DOCUMENTS

| | | | |
|---|---|---|---|
| 7,314,425 B2 | 1/2008 | Ito et al. | |
| 2003/0109970 A1* | 6/2003 | Nakamori et al. | 701/22 |
| 2004/0235614 A1* | 11/2004 | Tajima et al. | 477/3 |
| 2005/0169765 A1 | 8/2005 | Ito et al. | |

FOREIGN PATENT DOCUMENTS

| | | |
|---|---|---|
| JP | 09-286245 A | 11/1997 |
| JP | 2005-206021 A | 8/2005 |
| JP | 2007-23978 A | 2/2007 |
| JP | 2007-030593 A | 2/2007 |
| JP | 2007-32774 A | 2/2007 |

* cited by examiner

*Primary Examiner* — Paul N Dickson
*Assistant Examiner* — Robert A Coker
(74) *Attorney, Agent, or Firm* — Sughrue Mion, PLLC

(57) ABSTRACT

A vehicle control apparatus includes a vehicle drive device having a friction engagement element capable of being engaged and disengaged by an oil pressure generated by an electric oil pump, a start operation detecting unit that detects a start operation of the vehicle, a vehicle status change detecting unit that detects a status change of the vehicle, an electric oil pump control unit that controls the electric oil pump, and a management unit that is connected between the vehicle status change detecting unit and the electric oil pump control unit in a manner capable of transmitting data. The management unit transmits a wakeup signal to the electric oil pump control unit when a status change of the vehicle is detected, and when the wakeup signal is received prior to detection of the start operation, the electric oil pump control unit starts the electric oil pump in response to the wakeup signal.

20 Claims, 5 Drawing Sheets

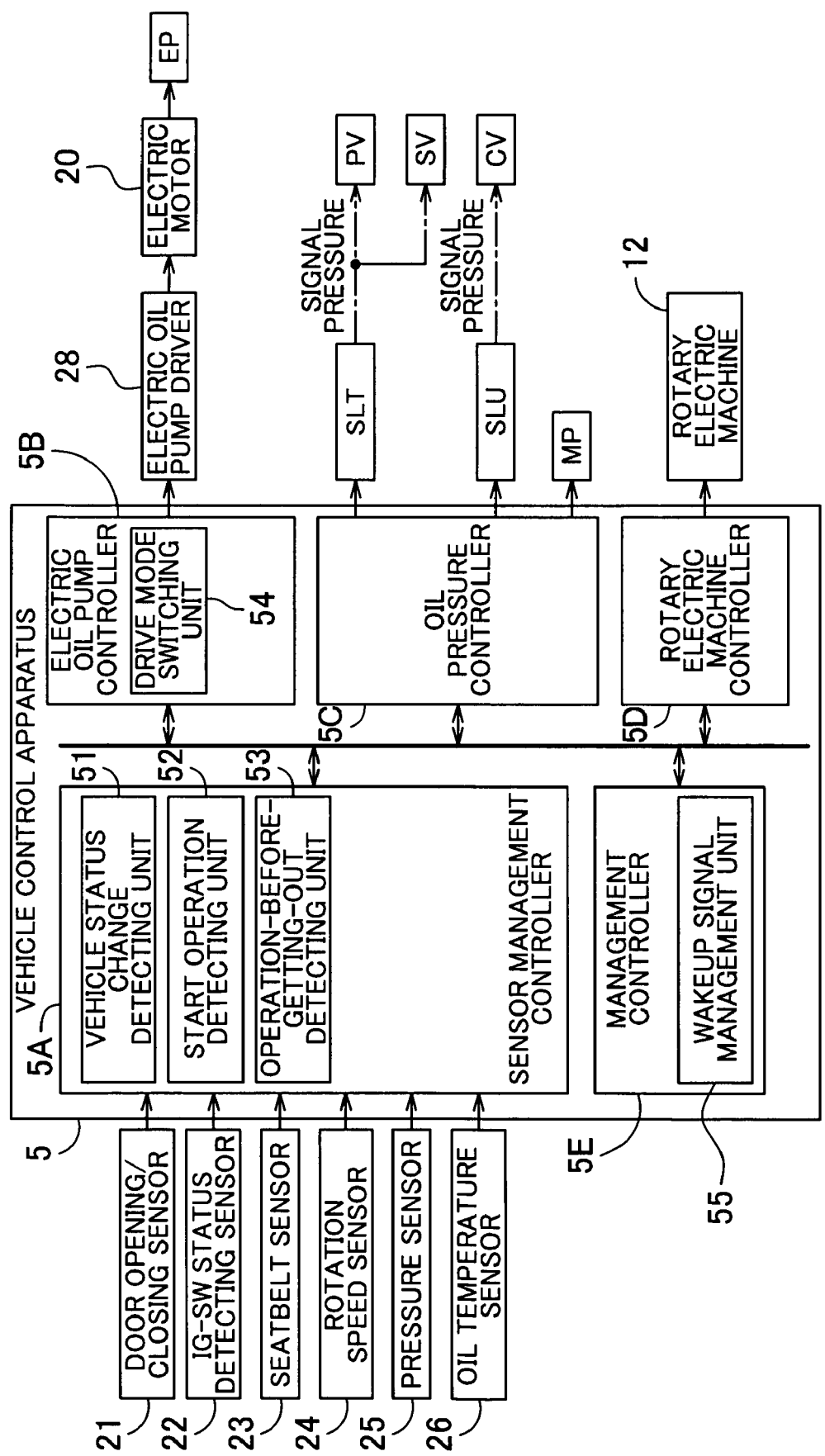
F I G. 2

VEHICLE CONTROL APPARATUS

INCORPORATION BY REFERENCE

The disclosure of Japanese Patent Application No. 2008-117398 filed on Apr. 28, 2008 including the specification, drawings and abstract is incorporated herein by reference in its entirety.

BACKGROUND OF THE INVENTION

1. Field of The Invention

The present invention relates to a vehicle control apparatus that includes a vehicle drive device having a friction engagement element capable of being engaged and disengaged by an oil pressure generated by an electric oil pump.

2. Description of The Related Art

In recent automobiles, in particular hybrid vehicles or idling stop vehicles, for the purpose of lubricating and keeping a predetermined oil pressure even when a drive source such as an engine or an electric motor is stopped, an electric oil pump driven by an electric motor is provided for assisting a mechanical oil pump, which is driven by a rotation force of the drive source. In this situation, the timing to start the electric oil pump is important. When this timing is too close to an actual start of traveling of the vehicle, the vehicle starts to travel with an insufficient oil pressure level, which leads to an uncomfortable start of traveling accompanying incomplete operation of friction engagement elements. Conversely, starting of the electric oil pump that is too early as compared to the actual start of traveling of the vehicle results in a waste of battery power.

Accordingly, there is known an oil pressure control apparatus having a pump start unit that starts the electric oil pump so that oil is supplied to a transmission before motive power is transmitted from a motive power source to the transmission (refer to, for example, Japanese Patent Application Publication No. JP-A H9-286245 (paragraph Nos. 0003 to 0082, FIG. 12, FIG. 13). This oil pressure control apparatus is intended to prevent the delay in supply of oil to the transmission and eliminate the inadequacy of the engagement force in a hydraulic engagement device for shifting speed and the like by starting the electric oil pump so that the oil is supplied to the transmission before motive power is transmitted from the motive power source to the transmission. As concrete measures thereof, it is proposed to provide a start operation unit that turns each drive source to a ready state capable of starting by selection of START after selection of ON, and to start the electric oil pump in response to the selection of ON by the start operation unit. Alternatively, it is proposed to provide a P-disengagement detecting unit that detects an operation of shifting the shift lever from a parking position, and to start the electric oil pump when the operation of shifting the shift lever from the parking position is detected by the P-disengagement detecting unit. Thus, the electric oil pump starts before the drive source starts.

When the oil pressure control apparatus described in Japanese Patent Application Publication No. JP-A H9-286245 is used, starting of the electric oil pump before starting of the drive source is assured. However, when the time period from starting of the drive source to actual starting of traveling of the vehicle is short, the friction engagement elements are engaged before the pressure in the hydraulic system is increased to a sufficient level by the electric oil pump. This may cause a problem of uncomfortable start of traveling accompanying incomplete operation of the friction engagement elements as described above. This problem stands out particularly in a situation when most of hydraulic oil of the hydraulic system has dropped in the drain due to a long period of parking or the like.

SUMMARY OF THE INVENTION

In view of the above situation, one aspect of the present invention is to provide a vehicle control apparatus capable of creating a state wherein a necessary oil pressure is supplied to a hydraulic system when the vehicle starts to travel.

A vehicle control apparatus according to the non-limiting embodiments of the present invention for achieving the above aspect includes a vehicle drive device having a friction engagement element capable of being engaged and disengaged by an oil pressure generated by an electric oil pump, a start operation detecting unit that detects a start operation of the vehicle, a vehicle status change detecting unit that detects a status change of the vehicle, an electric oil pump control unit that controls the electric oil pump, and a management unit that is connected between the vehicle status change detecting unit and the electric oil pump control unit in a manner capable of transmitting data. The management unit sends out a wakeup signal when a status change of the vehicle is detected by the vehicle status change detecting unit, and when the wakeup signal is received prior to detection of the start operation by the start operation detecting unit, the electric oil pump control unit starts the electric oil pump in response to the wakeup signal.

With this structure, there is detected a status change of the vehicle due to an operation of the vehicle performed prior to detection of a vehicle start operation by the start operation detecting unit or due to movement of the vehicle, and the electric oil pump starts in response to a wakeup signal being transmitted from the management unit when the status change is detected. That is, since the electric oil pump starts in response to a status change of the vehicle due to an operation of the vehicle performed prior to a start operation or due to movement of the vehicle, the electric oil pump has already started when the start operation is detected. Accordingly, even if a time period from the start operation to the actual start of traveling of the vehicle is short, an oil pressure is supplied to the hydraulic system by the electric oil pump that has started earlier, and thus the concern of delay in supply of oil pressure is eliminated. Therefore, the vehicle control apparatus according to the present invention is able to more reliably create a state that a necessary oil pressure is supplied to the hydraulic system when the vehicle starts to travel.

The electric oil pump control unit stops the electric oil pump when the wakeup signal is canceled. With this structure, when driving of the electric oil pump is unnecessary, the electric oil pump can be stopped securely by canceling the wakeup signal via a data transmission line.

Further, after the oil pressure has reached a rated oil pressure through starting of the electric oil pump, the electric oil pump control unit drives the electric oil pump in a half drive mode having a smaller discharge amount than a full drive mode until the start operation detecting unit detects the start operation. Specifically, when the electric oil pump is started in response to detection of a vehicle status change prior to detection of the start operation, further continuing full driving of the electric oil pump after the hydraulic system has reached the rated oil pressure (oil pressure at the level by which hydraulic devices can operate normally) is a waste of battery power unless the start operation is performed, and hence is uneconomical. Therefore, the electric oil pump is driven by the half drive mode having a smaller discharge amount than the full drive mode, thereby saving power consumption. Of course, in such cases, the electric oil pump may be fully driven again when the start operation is detected so that the hydraulic system can maintain the rated oil pressure. This half drive mode indicates a mode for driving the electric oil pump with a discharge amount that can quickly change the oil pressure of the hydraulic system to the rated oil pressure by returning to the full drive mode.

In one exemplary embodiment of the present invention, the vehicle drive device is provided with a mechanical oil pump coupled to an input member that inputs drive power of a drive source, and the electric oil pump is used as auxiliary for keeping, or retaining, the oil pressure when the drive source is stopped. In such a drive device in which the electric oil pump is used as auxiliary, the performance of the electric oil pump is kept low in view of costs, and consequently it takes a certain period of time to obtain the rated oil pressure by the electric oil pump. Therefore, the vehicle drive device using the electric oil pump as auxiliary is in an environment that easily allows delay in supply of oil pressure. To such a structure, the present invention can be applied particularly effectively.

In another exemplary embodiment of the present invention, an electric motor is used as a drive source in the vehicle drive device. The electric motor starts more quickly as compared to an internal combustion engine and the like, and therefore a time period from the start-up to the start of traveling is short. Thus, delay in supply of oil pressure occurs easily. Furthermore, the electric motor is capable of generating maximum torque from the start of traveling, and hence a problem of slipping of friction engagement element such as clutches and brakes that operate by an oil pressure is likely to occur. Due to such reasons, the structure of the exemplary embodiments of the present invention that is capable of avoiding delay in supply of oil pressure becomes more effective when the electric motor is used as a drive source in the vehicle drive device.

The status changes of the vehicle that should be detected by the vehicle status change detecting unit, include status changes based on an operation of a structural member included in the vehicle body that is performed prior to a vehicle start operation and based on movement of a structural member itself. These status changes can be defined as a status change related to the vehicle body. Furthermore, there are status changes based on an operation or movement pertaining to when a driver gets in the vehicle, which is performed prior to the vehicle start operation, and they can be defined as a status change when getting in or out of the vehicle. The status change when getting out of the vehicle is included because getting out of the vehicle by the driver, as a state that there is no longer a possibility that the start operation will be performed, can still be important information for controlling the electric oil pump. The vehicle status change detecting unit detects, as a status change of the vehicle, at least one of the status changes related to the vehicle body and the status changes when getting in or out of the vehicle. Thus, it becomes possible to create a state wherein a necessary oil pressure is supplied to the hydraulic system when the vehicle starts to travel.

Specific examples of the status change related to the vehicle body and the status change when getting in or out of the vehicle include opening or closing of a vehicle door, opening or closing of a door lock, a sitting or leaving operation with respect to a driver's seat, a fastening or unfastening operation of a seat belt, an electric mirror operation, a window operation, and a seat adjusting operation. An operation selected from these examples can be used for detecting a status change related to the vehicle body and a status change when getting in or out of the vehicle. Further, as an exemplary embodiment, a structure may be adopted in which the management unit sends out the wakeup signal when at least one of them is detected.

Further, the management unit cancels the wakeup signal when the start operation is not detected by the start operation detecting unit within a predetermined time after the wakeup signal has been transmitted. According to this structure, it is possible to avoid a problem that after the electric oil pump starts, the electric oil pump is kept driving wastefully when the driver does not perform the start operation for some reason. However, there may be cases where it can be determined that the start operation is delayed slightly for some reasons and hence it is preferable to still wait for detection of the start operation, such as when a status change, for example, opening or closing of a door or the like, is detected and the electric oil pump starts, and thereafter a status change is further detected. Accordingly, in one of the exemplary embodiments of the present invention, counting of the predetermined time is performed by a timer, and when a status change of the vehicle is detected by the vehicle status change detecting unit during the counting, the timer is reset and restarted.

When an off operation of a vehicle start switch is detected, as events following this, a possibility that the driver gets out of the vehicle and a possibility that an on operation is performed again from a temporary off operation while the driver stays in the vehicle are conceivable. For considering both the problem of a delay in supply of oil pressure and the problem of wasteful usage of the electric oil pump with such possibilities, in one of the exemplary embodiments of the present invention, an operation-before-getting-out detecting unit that detects an off operation of a vehicle start switch is provided, and the management unit is structured to cancel the wakeup signal after a predetermined time has passed since detection of the off operation.

BRIEF DESCRIPTION OF THE DRAWINGS

FIG. 2 is a block diagram of an exemplary embodiment of a vehicle control apparatus;

DETAILED DESCRIPTION OF THE INVENTION

Figure 1:
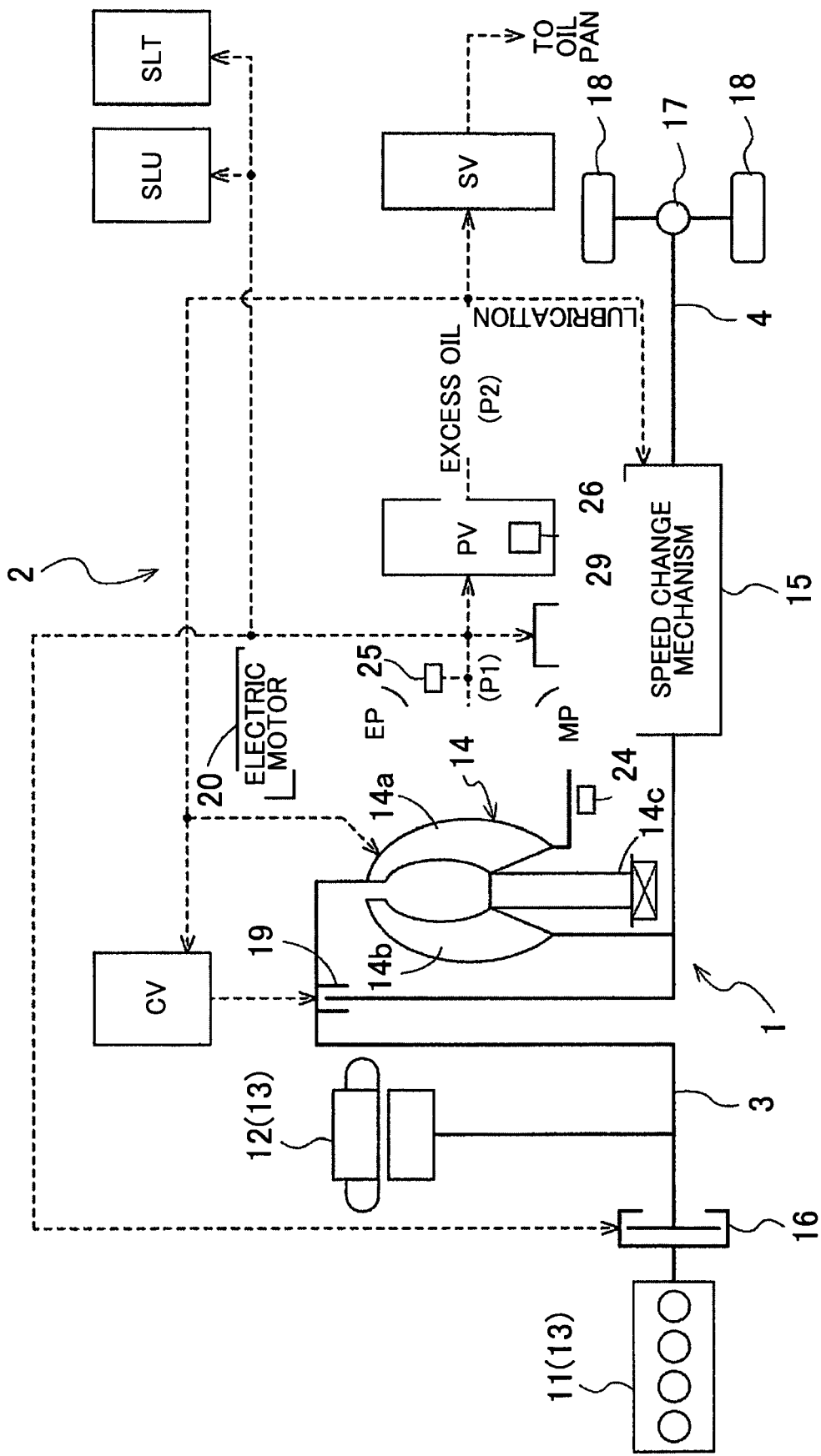
FIG. 1 is a schematic diagram showing schematic structures of one exemplary embodiment of a vehicle drive device and a hydraulic system.

Hereinafter, explanations will be given using an exemplary embodiment of applying a vehicle control apparatus according to the present invention to a hybrid vehicle. FIG. 1 shows a schematic diagram of schematic structures of a vehicle drive device (hereinafter simply abbreviated as a drive device) 1 and a hydraulic system 2. Note that in FIG. 1, solid lines show transmission paths of drive power, and dashed lines show supply routes of hydraulic oil.

[Overall Structure of the Drive Device]

First, based on FIG. 1, the schematic structure of the drive device 1 will be explained. As shown in FIG. 1, the drive device 1 includes an engine 11 and a rotary electric machine 12 as a drive power source 13 for driving the vehicle, and the engine 11 is coupled to an input member 3 via a transmission clutch 16. In this exemplary embodiment, the input member 3 is an input shaft arranged coaxially with an output rotary shaft of a crankshaft or the like of the engine 11. The rotary electric machine 12 is coupled to this input member 3. Accordingly, the engine 11 and the rotary electric machine 12 are coupled in series via the transmission clutch 16, and thereby the drive device 1 for a parallel-type hybrid vehicle is formed.

The rotary electric machine 12 is connected electrically to a power storage device (not shown) such as a battery or a capacitor, and is structured to function as an electric motor that generates motive power when supplied with electric power, and also to function as a generator that generates electric power when supplied with motive power. Between the engine 11 and the rotary electric machine 12, the transmission clutch 16 capable of connecting and disconnecting motive power from the engine 11 is provided. This transmission clutch 16 is controlled and operated by an oil pressure control valve (not shown) upon supply of hydraulic oil at a line pressure P1, which will be described later, and is one of friction engagement elements that can be engaged/disengaged by an oil pressure in the present invention.

In this drive device 1, the transmission clutch 16 is released and the engine 11 is stopped when the vehicle starts to travel or travels at low speed, and only rotary drive power of the rotary electric machine 12 is transmitted to wheels 18 via a differential device 17. The rotary electric machine 12 is supplied with electric power from the not-shown power storage device to generate drive power. In a state that the rotation speed (that is, traveling speed of the vehicle) of the rotary electric machine 12 is equal to or higher than a certain speed, the transmission clutch 16 is engaged so as to crank and start the engine 11. After the engine 11 is started, rotary drive power of both the engine 11 and the rotary electric machine 12 is transmitted to the wheels 18. At this time, depending on a charging state of the power storage device, the rotary electric machine 12 can be either in the state of generating electric power by the rotary drive power of the engine 11 or in the state of generating drive power by the electric power supplied from the power storage device. Further, when the vehicle is decelerating, the transmission clutch 16 is released, the engine 11 is stopped, and the rotary electric machine 12 turns to a state of generating electric power by rotary drive power transmitted from the wheels 18. The electric power generated by the rotary electric machine 12 is stored in the power storage device. When the vehicle is stopped, both the engine 11 and the rotary electric machine 12 are stopped and the transmission clutch 16 is released.

A torque converter 14 is provided on a transmission downstream side of the drive power source 13. The torque converter 14 is structured to include a pump impeller 14a as an input side rotation member coupled to the input member 3, a turbine runner 14b as an output side rotation member coupled to a speed change mechanism 15, and a stator 14c having a one-way clutch and being provided between the pump impeller 14a and the turbine runner 14b. The torque converter 14 transmits drive power between the pump impeller 14a on the driving side and the turbine runner 14b on the driven side via hydraulic oil filled therein.

A lock-up clutch 19 is provided in the torque converter 14, and in a state wherein the lock-up clutch 19 is engaged, drive power of the drive power source 13 is transmitted directly to the speed change mechanism 15 without using the hydraulic oil. The torque converter 14 including the lock-up clutch 19 is supplied with hydraulic oil at a regulated pressure P2, which will be described later.

When the shift speed of the speed change mechanism 15 is switched, the lock-up clutch 19 is released and drive power is transmitted via the hydraulic oil. This suppresses generation of shock accompanying switching of the shift speed. Further, when the vehicle starts to travel, the lock-up clutch 19 remains engaged, and the vehicle starts to travel by drive power of the rotary electric machine 12. Accordingly, when the vehicle starts to travel, slipping in the torque converter 14 can be suppressed by engaging the lock-up clutch 19, thereby improving the vehicle's acceleration performance from standstill. Heating up of the hydraulic oil in the torque converter 14 is also suppressed, and hence the energy efficiency can be increased.

The speed change mechanism 15 is coupled to the transmission downstream side of the torque converter 14. By this speed change mechanism 15, rotation of motive power from the drive power source 13 transmitted via the torque converter 14 is shifted by a predetermined change gear ratio and transmitted to the side of the wheels 18. The speed change mechanism 15 is formed of a stepped automatic transmission, and is structured to include friction engagement elements such as clutches, brakes, and the like for engaging or releasing rotation elements of a gear mechanism that generates change gear ratios of respective shift speeds. These friction engagement elements of the speed change mechanism 15 are supplied with hydraulic oil at the line pressure P1 is controlled and operated by an oil pressure control valve 29 for shift speed control as described later. In addition, the speed change mechanism 15 may be formed of a continuously variable automatic transmission, and in this case, operations of respective pulleys on the driving side and driven side are controlled in the continuously variable automatic transmission upon supply of the hydraulic oil at the line pressure P1, so as to perform a shifting operation of the continuously variable automatic transmission.

An output member 4 is coupled to the transmission downstream side of the speed change mechanism 15. In this exemplary embodiment, the output member 4 is an output shaft arranged coaxially with the input shaft as the input member 3. The wheels 18 are connected to this output member 4 via the differential device 17. Accordingly, rotary drive power transmitted to the input member 3 from the drive power source 13 is shifted by the speed change mechanism 15 and transmitted to the output member 4, and the rotary drive power transmitted to this output member 4 is transmitted to the wheels 18 via the differential device 17.

[Structure of the Hydraulic System]

The structure of the hydraulic system 2 will be explained based on FIG. 1 and FIG. 2. FIG. 2 is a block diagram showing functions and structural elements related to the exemplary embodiments of the present invention in a vehicle control apparatus 5 for the drive device 1. As shown in FIG. 1, the hydraulic system 2 is structured to include two kinds of pumps, a mechanical oil pump MP and an electric oil pump EP, as oil pressure sources for supplying oil to respective parts of the drive device 1. The mechanical oil pump MP is an oil pump that operates by drive power of the drive power source 13. In this exemplary embodiment, the mechanical oil pump MP is coupled to the pump impeller 14a of the torque converter 14 and driven by rotary drive power of the rotary electric machine 12 or rotary drive power of both the engine 11 and the rotary electric machine 12.

As shown in FIG. 1 and FIG. 2, the electric oil pump EP is an oil pump that operates by drive power of an electric motor 20 irrelevantly to drive power of the drive power source 13. The electric oil pump EP is structured to assist the mechanical oil pump MP, and operates in a state wherein an adequate flow amount of hydraulic oil is not supplied from the mechanical oil pump MP when, for example, the vehicle is traveling at low speed, or when the vehicle is stopped.

As pressure regulator valves for regulating the pressure of hydraulic oil supplied from the mechanical oil pump MP and the electric oil pump EP to a predetermined pressure, a primary regulator valve PV and a secondary regulator valve SV are provided. The primary regulator valve PV is a pressure regulator valve that regulates the pressure of hydraulic oil supplied from the mechanical oil pump MP and the electric oil pump EP to a predetermined line pressure P1, and regulates the line pressure P1 (pressure to be the reference oil pressure of the drive device 2) based on a predetermined signal pressure supplied from a linear solenoid valve SLT. The secondary regulator valve SV is a pressure regulator valve that regulates the oil pressure of excess oil from the primary regulator valve PV to a predetermined regulated pressure P2, and regulates the excess oil drained from the primary regulator valve PV to the regulated pressure P2 while draining part of the excess oil to an oil pan, based on a signal pressure supplied from the linear solenoid valve SLT.

The linear solenoid valve SLT is supplied with hydraulic oil at the predetermined line pressure P1 after being regulated by the primary regulator valve PV, and regulates the opening of the valve according to an SLT instruction value output from the vehicle control apparatus 5 and thereby outputs hydraulic oil at a predetermined signal pressure according to the SLT instruction value to the primary regulator valve PV and the secondary regulator valve SV. The hydraulic oil at the line pressure P1 regulated by the primary regulator valve PV is supplied to the friction engagement elements such as clutches and brakes included in the speed change mechanism 15, the transmission clutch 16, and the like, and the hydraulic oil at the regulated pressure P2 regulated by the secondary regulator valve SV is supplied to lubrication oil paths of the speed change mechanism 15, the torque converter 14, a lock-up control valve CV for controlling the lock-up clutch 19, and the like.

The lock-up control valve CV is a valve for controlling an operation of engaging or releasing the lock-up clutch 19, and is supplied with the hydraulic oil at the regulated pressure P2 after being regulated by the secondary regulator valve SV. The valve is opened or closed according to a predetermined signal pressure from a linear solenoid valve SLU for lock-up control so as to supply the hydraulic oil at the regulated pressure P2 regulated by the secondary regulator valve SV to an oil pressure chamber of the lock-up clutch 19, thereby controlling an operation of engaging or releasing the lock-up clutch 19.

[Structure of the Vehicle Control Apparatus]

Next, the vehicle control apparatus 5 will be explained based on FIG. 2. The vehicle control apparatus 5 includes a sensor management controller 5A that manages states of various types of sensors, an electric oil pump controller 5B that functions as an electric oil pump control unit that controls operation of the electric oil pump EP, an oil pressure controller 5C that generates and outputs control signals to various types of hydraulic devices, a rotary electric machine controller 5D that controls operation of the rotary electric machine 12, and a management controller 5E that functions as a management unit that generates and gives necessary information to the controllers. These controllers are each formed of a computer having a communication function and are capable of transmitting data to each other via a network.

To the sensor management controller 5A, there are connected: a group of sensors that mainly detect an operation of the vehicle performed by an occupant, such as a door opening/closing sensor 21 that detects an opening or closing operation of a vehicle door, an IG-SW status detecting sensor 22 that detects an ON/OFF status or the like of an ignition switch (IG-SW) serving as a vehicle start switch, a seat belt sensor 23 that detects a fastening or unfastening operation of a seat belt, and the like; and a group of sensors that detect states of vehicle structural elements, such as a rotation speed sensor 24, a pressure sensor 25, an oil temperature sensor 26, and the like. The rotation speed sensor 24 is attached to an input section of the mechanical oil pump MP for detecting the rotation speed of the mechanical oil pump MP, and detects the rotation speed of the input section of the mechanical oil pump MP. The pressure sensor 25 is provided on a merged oil path where an oil path connected to a discharge port of the mechanical oil pump MP and an oil path connected to a discharge port of the electric oil pump EP are merged, and this pressure sensor 25 detects a pressure of hydraulic oil supplied from the mechanical oil pump MP and the electric oil pump EP. The oil temperature sensor 26 is provided in the primary regulator valve PV, and this oil temperature sensor 26 detects, as an oil temperature of a transaxle, an oil temperature of hydraulic oil discharged from the mechanical oil pump MP and the electric oil pump EP (for example, hydraulic oil discharged from the electric oil pump EP in a state that only the electric oil pump EP is driving). The oil temperature sensor 26 may be connected to a different position, and may be connected to, for example, the oil path connected to the discharge port of the electric oil pump EP, the inside of the electric oil pump EP, or the discharge port of the electric oil pump EP.

The group of sensors that detect operation of the vehicle performed by an occupant may also include, although not shown, a door lock sensor that detects an opening or closing operation of a door lock, a sitting/leaving sensor structured as a weight sensor for detecting a sitting or leaving operation with respect to a driver's seat, an electric mirror sensor that detects an operation of an electric mirror, a window sensor that detects an operation of a window, a seat adjustment sensor that detects an adjusting operation of a seat, and so on. For such sensors, generally there are adopted structures that detect an operation indirectly by detecting an electric current or the like flowing in a motor or the like used for this operation, rather than a structure to detect this operation directly. In this case, detection signals are sent by virtual sensors which are also handled by the sensor management controller 5A.

In the sensor management controller 5A, it is possible to implement a function to evaluate various events based on signals from such sensors. Examples include a vehicle status change detecting unit 51 that detects a status change of the vehicle, a start operation detecting unit 52 that detects a start operation of the vehicle, and an operation-before-getting-out detecting unit 53 that detects an operation before getting out by the driver. The vehicle status change detecting unit 51 has a function to detect a status change related to the vehicle or a status change when getting in or out of the vehicle by recognizing at least one of opening or closing of a vehicle door, opening or closing of a door lock, a sitting or leaving operation with respect to a driver's seat, a fastening or unfastening operation of a seat belt, an electric mirror operation, a window operation, and a seat adjusting operation, based on a signal inputted by the sensor management controller 5A. The start operation detecting unit 52 has a function to detect that the driver has performed a start operation of the drive device 1 based on a signal from the IG-SW status detecting sensor 22. The operation-before-getting-out detecting unit 53 detects that the driver has performed an operation for getting out of the vehicle by recognizing an off operation of the ignition switch (IG-SW) serving as a vehicle start switch, based on a signal from the IG-SW status detecting sensor 22. Based on such detection results by the vehicle status change detecting unit 51, the start operation detecting unit 52, and further the operation-before-getting-out detecting unit 53, the electric oil pump controller 5B controls the electric oil pump EP appropriately as will be explained in detail later.

The rotary electric machine 12 including a control circuit is connected to the rotary electric machine controller 5D, and drive control of the rotary electric machine 12 is performed by a control signal from the rotary electric machine controller 5D.

The linear solenoid valve SLT and the linear solenoid valve SLU for lock-up control are connected to the oil pressure controller 5C. The SLT instruction value SLT to be a control signal of the linear solenoid valve SLT is determined by the oil pressure controller 5C based on various vehicle information such as traveling load, accelerator opening, or the like, and a corresponding control signal is outputted to the linear solenoid valve SLT. The linear solenoid valve SLU adjusts opening of the valve according to a control instruction value outputted from the vehicle control apparatus 5, and thereby outputs hydraulic oil at a predetermined signal pressure according to this control instruction value to the lock-up control valve CV.

An electric oil pump driver 28 that controls a drive current for the electric motor 20 that drives the electric oil pump EP is connected to the electric oil pump controller 5B. Transmitting a drive signal to the electric oil pump driver 28 by the electric oil pump controller 5B causes the electric motor 20 to drive, which thereby drives the electric oil pump EP. The electric oil pump controller 5B can drive the electric oil pump EP in at least two drive modes, a full drive mode for driving at maximum output and a half (quasi-) drive mode for securing a minimum oil pressure to the hydraulic system 2 with a smaller injection amount than the full drive mode. Switching the setting of the drive mode is performed by a drive mode switching unit 54. In addition, the drive level in the half drive mode of the electric oil pump EP is set to such a level that, when the electric oil pump EP is driven in the half drive mode, the hydraulic system 2 can be returned to a rated oil pressure quickly by switching to the full drive mode. That is, by driving the electric oil pump EP in the half drive mode, the hydraulic system 2 can maintain a standby oil pressure state at a level lower than the rated oil pressure.

The management controller 5E includes a wakeup signal management unit 55 that generates a wakeup signal and transmits it to the electric oil pump controller 5B when it is recognized that a status change of the vehicle such as opening/closing of a door is detected by the vehicle status change detecting unit 51. This wakeup signal is a signal for resuming driving of the electric oil pump EP that is halted, and driving of the electric oil pump EP by the electric oil pump controller 5B is resumed by receiving the wakeup signal. When the vehicle is traveling, the management controller 5E constantly outputs the wakeup signal, and thus the electric oil pump controller 5B is started. However, since the electric oil pump EP is auxiliary to the mechanical oil pump MP, the electric oil pump EP is stopped as long as the mechanical oil pump MP is driving and the hydraulic system 2 is maintained at the rated oil pressure. In a state wherein driving of the mechanical oil pump MP is stopped and the oil pressure cannot be supplied to the hydraulic system 2 due to temporal stop of the vehicle or the like, the electric oil pump EP drives and maintains the necessary oil pressure of the hydraulic system 2. The wakeup signal management unit 55 includes an internal timer, and has a function of canceling a wakeup signal when a predetermined time has passed after this wakeup signal is transmitted.

When the wakeup signal is canceled, the electric oil pump controller 5B immediately stops driving of the electric oil pump EP.

[Procedure of Control Processing]

Next, an example of basic control of the electric oil pump EP by the vehicle control apparatus 5 will be explained using a flowchart of FIG. 3.

Whether the vehicle is in a traveling mode or not is checked by the position of the shift lever, the state of the drive device 1, and the like (#01). When it is determined that the vehicle is in the traveling mode (#01, YES branch), the electric oil pump controller 5B controls driving of the electric oil pump EP based on an electric pump control routine while traveling. When the vehicle is not in the traveling mode but in a parking state before or after traveling or the like (#01, NO branch), the question of whether or not the wakeup signal is transmitted from the wakeup signal management unit 55 is checked (#02). When the wakeup signal is not transmitted (#02, NO branch), the electric oil pump EP in a driving state is stopped (#03). When the electric oil pump EP is in a stopped state, the stopped state is kept as it is. When the wakeup signal is transmitted (#02, YES branch), it is further checked which of the full drive mode and the half drive mode the drive mode switching unit 54 has set (#04). When the half drive mode is set (#04, HALF branch), the electric oil pump EP is driven in the half drive mode (#05). That is, the electric oil pump EP turns to a state of waiting for driving in the complete full drive mode. When the full drive mode is set (#04, FULL branch), the electric oil pump EP is driven in the full drive mode (#06).

Next, control of the electric oil pump EP by the vehicle control apparatus 5 will be explained using a time chart shown in FIG. 4 and a flowchart shown in FIG. 5. The control of the electric oil pump EP creates a state wherein a necessary oil pressure is supplied to the hydraulic system 2 when the vehicle starts to travel.

Figure 4:
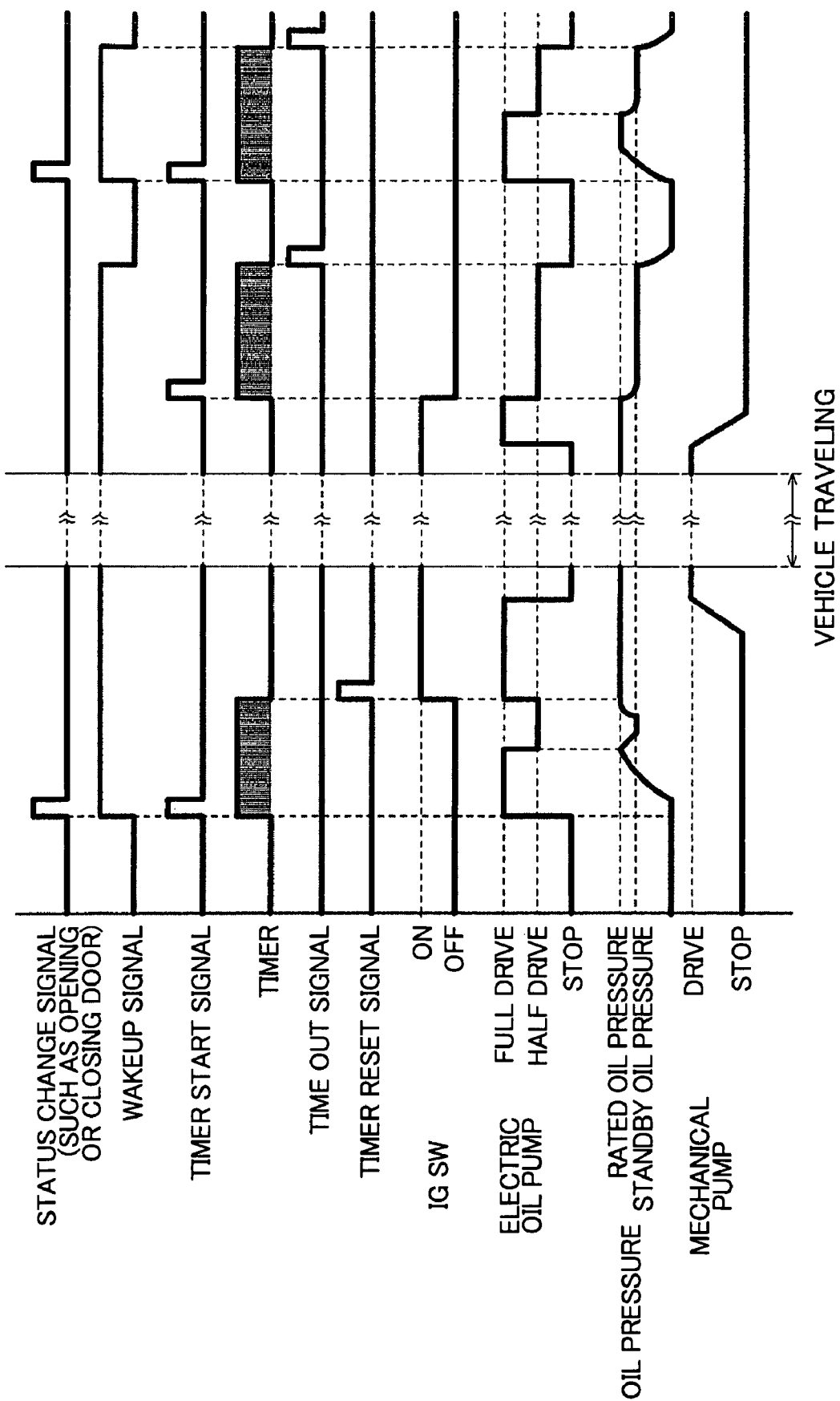
FIG. 4 is a time chart of control related to an exemplary embodiment of the present invention in the vehicle control apparatus.

The time chart of FIG. 4 represents control of the electric oil pump EP from when a driver gets in a parked vehicle until the vehicle starts to travel, and control of the electric oil pump EP from when the vehicle is parked until the driver gets out of the vehicle. During traveling of the vehicle therebetween, driving of the electric oil pump EP is controlled by the different electric pump control routine while traveling as described above.

Figure 5:
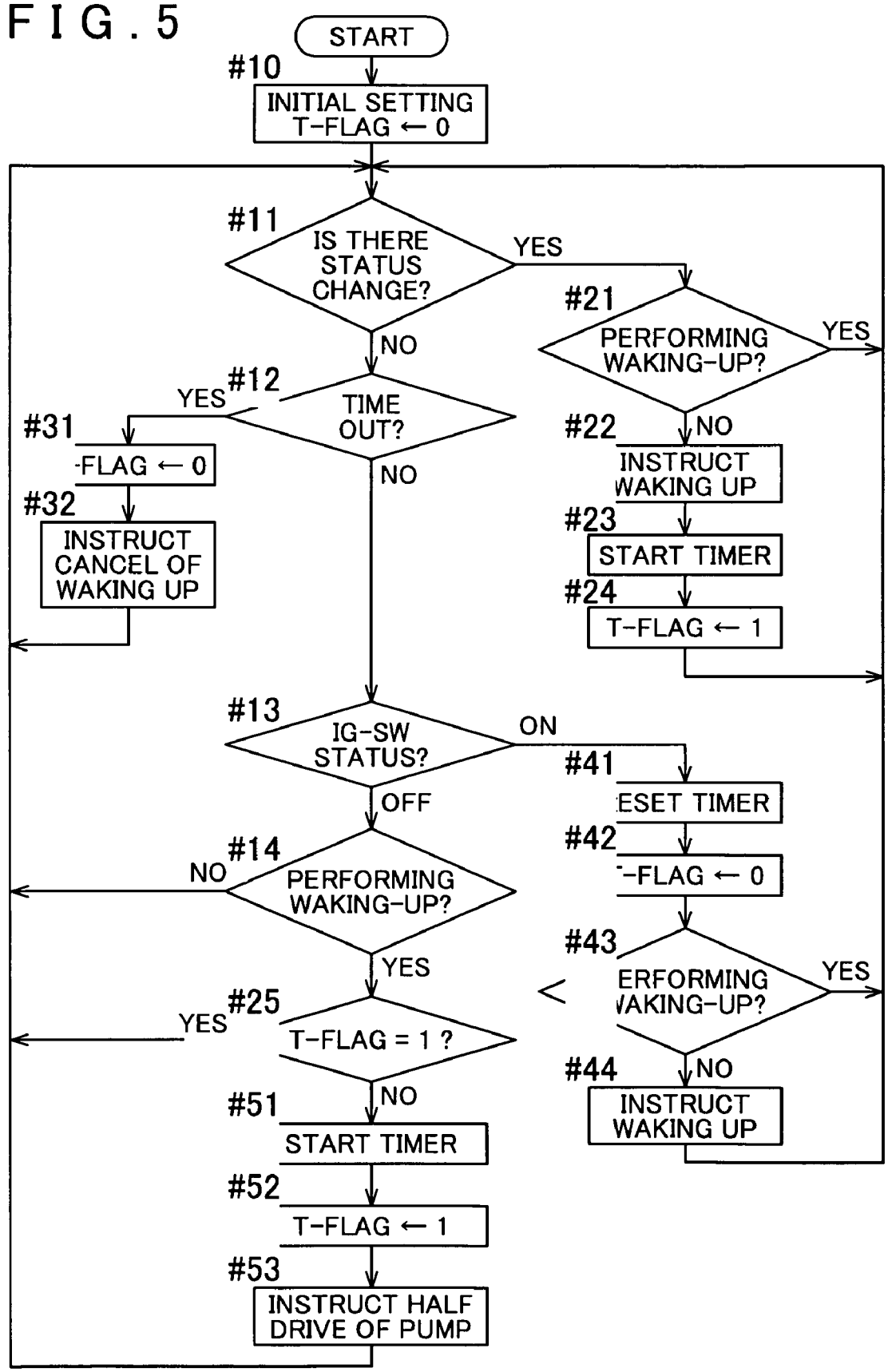
FIG. 5 is a flowchart of control related to an exemplary embodiment of the present invention in the vehicle control apparatus.

First, as shown in FIG. 5, "0" is set to a T-flag in an initial setting (#10). Here, the T-flag is a flag representing an operation state of the internal timer provided in the wakeup signal management unit 55. The T-flag being "0" represents a state wherein counting of time by the timer is not performed, and the T-flag being "1" represents a state wherein counting of time by the timer is performed. As part of the function of the vehicle control apparatus 5, the vehicle status change detecting unit 51 is started even when the vehicle is parked, and it is checked whether a status change of the vehicle such as opening/closing of a door occurs or not (#11). Before the driver gets in, normally a status change of the vehicle does not occur (#11, NO branch), and hence the process proceeds and whether a time out has occurred or not is checked (#12). In this stage, the time out would not happen since the timer has not started yet (#12, NO branch). The process further proceeds and whether the driver has performed a start operation of the drive device 1 or not is checked based on a signal from the IG-SW status detecting sensor 22. That is, whether the IG-SW state is ON or OFF is checked (#13). Naturally, the IG-SW state is initially OFF, and thus the process further proceeds and whether waking up is currently performed or not, that is, whether the wakeup signal is transmitted from the wakeup signal management unit 55 or not, is checked (#14).

Until now, the wakeup signal is not transmitted since the vehicle is parked (#14, NO branch), and hence the process returns to #11. Before the driver gets in the parked vehicle, merely these steps #11, #12, #13, and #14 are repeated.

Here, for example, when the driver opens a door to get in the parked vehicle, the vehicle status change detecting unit 51 detects this status change (#11, YES branch). In this case, whether waking up is currently performed or not, that is, whether the wakeup signal is transmitted from the wakeup signal management unit 55 or not, is checked (#21). Up to now, the wakeup signal is not transmitted since the vehicle is parked. Thus the wakeup signal management unit 55 generates the wakeup signal for the first time, transmits it to the electric oil pump controller 5B (#22), starts the timer (#23), and sets "1" to the T-flag (#24). When the electric oil pump controller 5B receives the wakeup signal, it causes the electric oil pump EP to drive as is clear from the flowchart in FIG. 3. The drive mode of the electric oil pump EP is set to the full drive mode as a default, and thus the electric oil pump EP fully drives. This increases the oil pressure of the hydraulic system 2 gradually as is clear from the time chart in FIG. 4. In this exemplary embodiment, when the oil pressure of the hydraulic system 2 reaches the rated oil pressure after the electric oil pump EP is started initially, the drive mode switching unit 54 switches the drive mode once from the full drive mode to the half drive mode, thereby turning the oil pressure of the hydraulic system 2 to a standby oil pressure.

Returning to the flowchart of FIG. 5, when the process returns to step #11 after step #24, it is checked whether a new status change of the vehicle occurs or not. Normally, a new status change would not occur, and thus the process proceeds to step #14, and it is checked whether or not the wakeup signal is transmitted from the wakeup signal management unit 55 (#14). At this time, since the wakeup signal is transmitted in step #22 (#14, YES branch), the state of the T-flag is checked in the next step (#25). Here, since "1" is set to the T-flag (#25, YES branch) in step #24, the process returns to step #11. In this case, #11, #12, #13, #14, and #25 are repeated for a while. When a new status change occurs (#11, YES branch), the process returns to step #11 via step #21.

When the driver performs a start operation of the vehicle, the process branches in step #13 to ON so as to start traveling of the vehicle, but when the timer expires earlier than that, the process branches in step #12 to YES. The latter case where the timer expires is a situation wherein the driver still has not started the vehicle after getting in the vehicle. In this case, it is not preferable that the electric oil pump EP is continued to be driven. Therefore, "0" is set to the T-flag (#31), the wakeup signal is canceled (#32), and the process returns to step #11. This timer time is set to an adequate time for the driver who has gotten in the vehicle to perform the start operation. Thus, normally, turning ON of the IG-SW state occurs in step #13, and a preparation process for vehicle traveling is carried out in step #41 and subsequent steps.

In this preparation process for vehicle traveling, the timer is reset once (#41), and "0" is set to the T-flag (#42). Further, whether waking up is currently performed or not is checked (#43). Normally, the driver has opened the door and gotten in the vehicle before performing the start operation, and thus the status change is detected and the wakeup signal management unit 55 sends out the wakeup signal. Therefore, in this checking, it is determined that waking up is performed (#43, YES branch), and the process returns to step #11. However, when the driver takes time after getting in the vehicle and does not perform a start operation until after the timer expires, the waking up is canceled once in step #32. In such a state, when the driver starts a start operation, it is determined in the checking that waking up is not performed (#43, NO branch). Thus, the wakeup signal management unit 55 generates a wakeup signal, transmits it to the electric oil pump controller 5B (#44), and returns to step #11.

Figure 3:
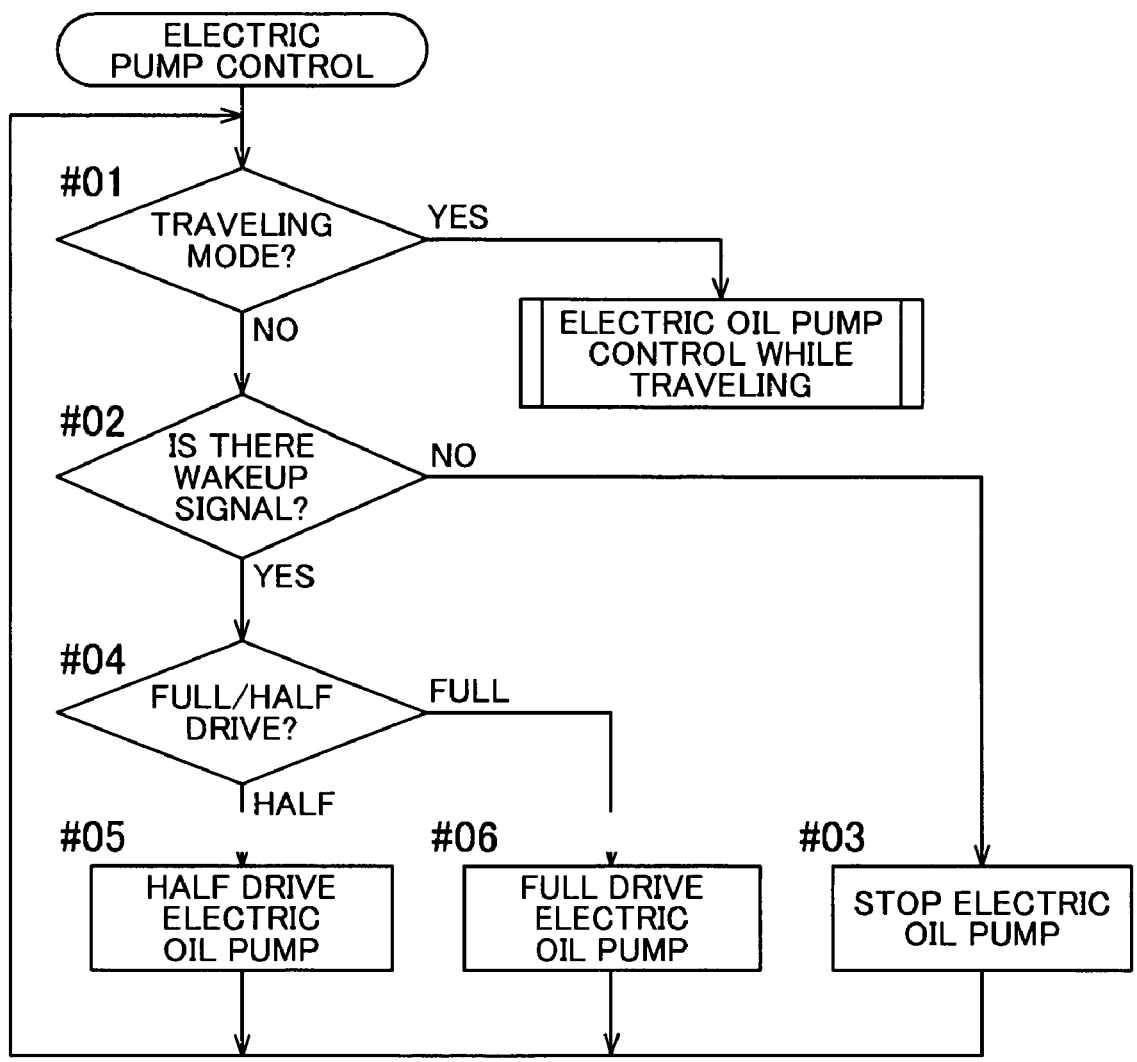
FIG. 3 is a flowchart showing an exemplary embodiment of a flow of basic control of an electric oil pump.

When the vehicle turns to a traveling state, the electric pump control while traveling takes priority, as is clear from the flowchart in FIG. 3. Thus, the electric oil pump EP assists the mechanical oil pump MP and contributes to maintain the oil pressure level of the hydraulic system 2 at the rated oil pressure.

When traveling of the vehicle is finished, the driver stops the vehicle, turns off the ignition switch as the vehicle start switch, and gets out of the vehicle. The off operation of the vehicle start switch following stopping of the vehicle at this time is detected as an operation before getting out of the vehicle by the operation-before-getting-out detecting unit 53. Accordingly, in step #13, it is determined that the IG-SW state is OFF (#13, OFF branch). Further, it is in a waking-up state when the vehicle is traveling, and the timer is left reset. Thus, it is determined in step #14 that waking up is performed (#14, YES branch), and the content of the T-flag is determined to be "0" in step #25 (#14, NO branch). Thereafter, as processing before getting out of the vehicle, the timer starts (#51), and "1" is set to the T-flag (#52). At this stage, the vehicle is stopped, and the electric oil pump EP is fully driving instead of the mechanical oil pump MP. Thus, a switching instruction from the full drive mode to the half drive mode is given to the drive mode switching unit 54 of the electric oil pump controller 5B (#53), and the process returns to step #11. This is because even when the ignition switch is turned off, there is a possibility of the switch turning on again and moving the vehicle, and considering this possibility, the process is placed on standby for a predetermined time set by the timer in half driving. When the timer expires (#12, YES branch), the wakeup signal is canceled (#32), and thus the electric oil pump EP stops. As shown in the time chart of FIG. 4, after the electric oil pump EP is stopped once, the wakeup signal is generated again when a status change of the vehicle is detected by the vehicle status change detecting unit 51, resulting in driving of the electric oil pump EP. However, expiration of the timer causes the electric oil pump EP to stop.

OTHER EXEMPLARY EMBODIMENTS

In the above-described exemplary embodiment, most of the various sensors are connected to the sensor management controller 5A, and signals are sent therefrom to the controllers requiring them. However, instead of such a structure, a structure may be adopted in which the various sensors are connected directly to the controllers requiring detected signals thereof. Further, the vehicle status change detecting unit 51, the start operation detecting unit 52, and the operation-before-getting-out detecting unit 53 may be provided in another controller rather than in the sensor management controller 5A. Furthermore, it is also possible to integrally form the management controller 5E with the sensor management controller 5A. In an automobile, there are provided plural controllers called ECU that manage various sections of the automobile respectively, such as a body ECU, an engine ECU, a transmission ECU and the like, for example. Therefore, a structure in which wakeup signals are outputted appropriately from respective controllers may be provided.

In the above-described exemplary embodiment, there is given an example of applying the vehicle control apparatus according to the present invention to a hybrid vehicle. However, an applicable range of the vehicle control apparatus according to the present invention is not limited to such a vehicle, and the vehicle control apparatus can be applied to a vehicle other than hybrid vehicles, for example, an electric vehicle adopting only the rotary electric machine 12 as a drive power source, a vehicle adopting only an engine as a drive power source, and the like. Particularly, the vehicle control apparatus can be applied to an idling-stop vehicle, which does not include the rotary electric machine 12, and in which the engine is stopped while the vehicle is stopped and an oil pressure is supplied by driving the electric oil pump EP.

The present invention can be used for a vehicle control apparatus that includes a vehicle drive device having a friction engagement element capable of being engaged and disengaged by an oil pressure generated by an electric oil pump, a start operation detecting unit that detects a start operation of the vehicle, a vehicle status change detecting unit that detects a status change of the vehicle, an electric oil pump control unit that controls the electric oil pump, and a management unit that is connected between the vehicle status change detecting unit and the electric oil pump control unit in a manner capable of transmitting data.

The above description of the exemplary embodiments of the invention have been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A vehicle control apparatus for a vehicle comprising:
   a vehicle drive device having a friction engagement element capable of being engaged and disengaged by an oil pressure generated by an electric oil pump;
   a start operation detecting unit that detects a start operation of the vehicle;
   a vehicle status change detecting unit that detects a status change of the vehicle;
   an electric oil pump control unit that controls the electric oil pump; and
   a management unit that is connected between the vehicle status change detecting unit and the electric oil pump control unit in a manner capable of transmitting data, wherein
   the management unit transmits a wakeup signal to the electric oil pump control unit when a status change of the vehicle is detected by the vehicle status change detecting unit, and
   when the wakeup signal is received by the electric oil pump control unit prior to the start operation detecting unit detecting the start operation of the vehicle, the electric oil pump control unit starts the electric oil pump in response to the wakeup signal
   wherein the start operation detecting unit detects the start operation of the vehicle by detecting an ON operation of the vehicle start switch.

2. The vehicle control apparatus according to claim 1, wherein
   the electric oil pump control unit stops the electric oil pump when the wakeup signal is canceled.

3. The vehicle control apparatus according to claim 2, wherein
   the electric oil pump control unit drives the electric oil pump in a half drive mode having a smaller discharge amount than a full drive mode after the oil pressure has reached a rated oil pressure due to starting of the electric oil pump and until the start operation detecting unit detects the start operation.

4. The vehicle control apparatus according to claim 3, wherein
   the vehicle drive device is provided with a mechanical oil pump coupled to an input member that inputs drive power of a drive source, and the electric oil pump is used as auxiliary to retain the oil pressure when the drive source is stopped.

5. The vehicle control apparatus according to claim 4, wherein
   an electric motor is used as a drive source in the vehicle drive device.

6. The vehicle control apparatus according to claim 5, wherein
   the vehicle status change detecting unit detects, as the status change of the vehicle, at least one of a status change related to a vehicle body and a status change when getting in or out of the vehicle.

7. The vehicle control apparatus according to claim 6, wherein
   the vehicle status change detecting unit detects, as the status change related to the vehicle body and the status change when getting in or out of the vehicle, at least one of opening and closing of a vehicle door, opening and closing of a door lock, a sitting and leaving operation with respect to a driver's seat, a fastening and unfastening operation of a seat belt, an electric mirror operation, a window operation, and a seat adjusting operation.

8. The vehicle control apparatus according to claim 7, wherein
   the management unit cancels the wakeup signal when the start operation is not detected by the start operation detecting unit within a predetermined time after the wakeup signal has been transmitted.

9. The vehicle control apparatus according to claim 8, wherein
   counting of the predetermined time is performed by a timer, and when a status change of the vehicle is detected by the vehicle status change detecting unit during the counting, the timer is restarted.

10. The vehicle control apparatus according to claim 9, further comprising:
    an operation-before-getting-out detecting unit that detects an off operation of a vehicle start switch, wherein
    the management unit cancels the wakeup signal after a predetermined time has passed since detection of the off operation.

11. The vehicle control apparatus according to claim 9, further comprising:
    an operation-before-getting-out detecting unit that detects an off operation of a vehicle start switch, wherein
    the management unit cancels the wakeup signal after a predetermined time has passed since detection of the off operation.

12. The vehicle control apparatus according to claim 2, wherein
    the management unit cancels the wakeup signal when the start operation is not detected by the start operation detecting unit within a predetermined time after the wakeup signal has been transmitted.

13. The vehicle control apparatus according to claim 1, wherein
    the electric oil pump control unit drives the electric oil pump in a half drive mode having a smaller discharge amount than a full drive mode after the oil pressure has reached a rated oil pressure due to starting of the electric oil pump and until the start operation detecting unit detects the start operation.

14. The vehicle control apparatus according to claim 1, wherein
the vehicle drive device is provided with a mechanical oil pump coupled to an input member that inputs drive power of a drive source, and the electric oil pump is used as auxiliary to retain the oil pressure when the drive source is stopped.

15. The vehicle control apparatus according to claim 1, wherein
an electric motor is used as a drive source in the vehicle drive device.

16. The vehicle control apparatus according to claim 1, wherein
the vehicle status change detecting unit detects, as the status change of the vehicle, at least one of a status change related to a vehicle body and a status change when getting in or out of the vehicle.

17. The vehicle control apparatus according to claim 16, wherein
the vehicle status change detecting unit detects, as the status change related to the vehicle body and the status change when getting in or out of the vehicle, at least one of opening and closing of a vehicle door, opening and closing of a door lock, a sitting and leaving operation with respect to a driver's seat, a fastening and unfastening operation of a seat belt, an electric mirror operation, a window operation, and a seat adjusting operation.

18. The vehicle control apparatus according to claim 1, wherein
the management unit cancels the wakeup signal when the start operation is not detected by the start operation detecting unit within a predetermined time after the wakeup signal has been transmitted.

19. The vehicle control apparatus according to claim 18, wherein
counting of the predetermined time is performed by a timer, and when a status change of the vehicle is detected by the vehicle status change detecting unit during the counting, the timer is restarted.

20. The vehicle control apparatus according to claim 1, further comprising:
an operation-before-getting-out detecting unit that detects an off operation of a vehicle start switch, wherein
the management unit cancels the wakeup signal after a predetermined time has passed since detection of the off operation.

* * * * *